April 3, 1956     F. H. CARY     2,740,951
TELEMETRIC APPARATUS FOR LOW AND HIGH RANGE VALUES
Filed March 31, 1953
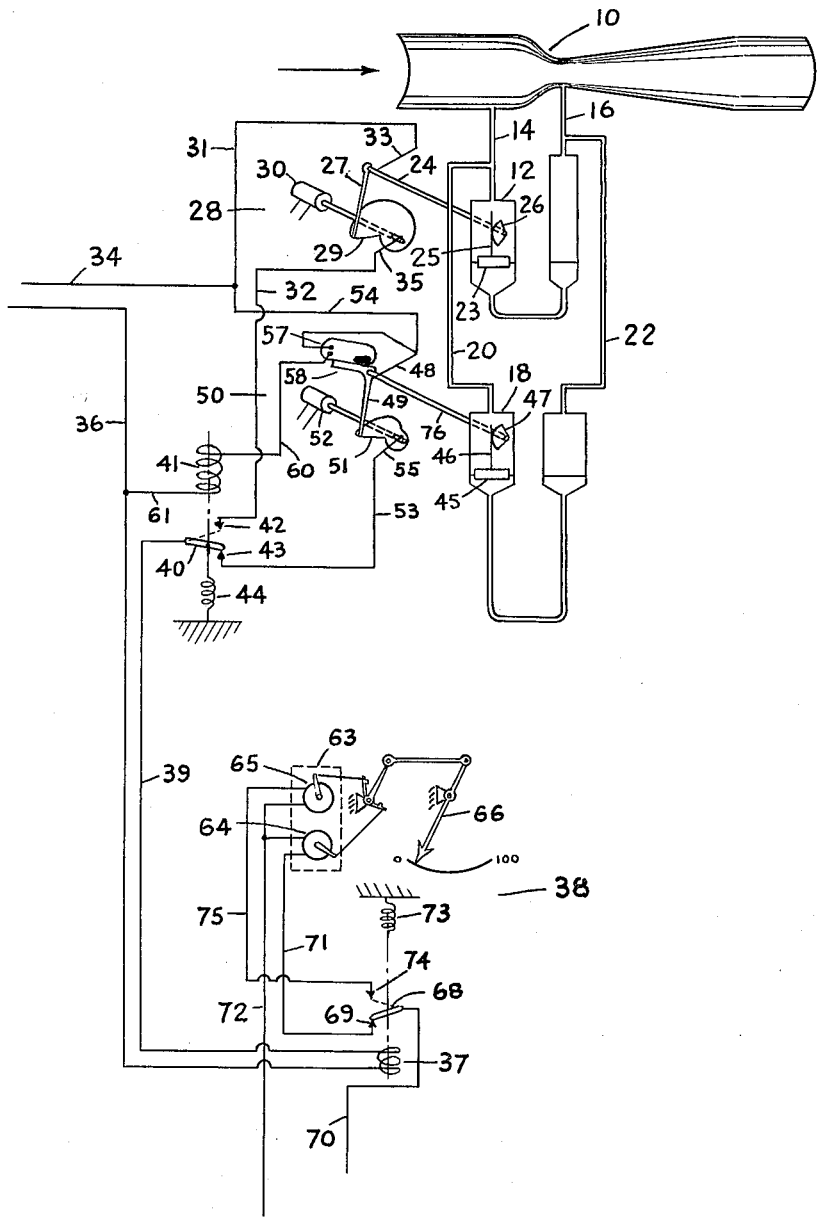
Francis H. Cary
INVENTOR.
BY E. C. Sanborn
Attorney

2,740,951

TELEMETRIC APPARATUS FOR LOW AND HIGH RANGE VALUES

Francis H. Cary, Warwick, R. I., assignor to B-I-F Industries, Inc., a corporation of Rhode Island Application March 31, 1953, Serial No. 345,790

10 Claims. (Cl. 340—184)

This invention relates to telemetering, and more especially to the obtaining of desirable signal accuracy throughout the entire range of variation of the magnitudes under measurement. The invention is particularly concerned with telemetering systems of the "impulse-duration" type wherein there is customarily employed a transmitter having a cam rotatable continuously at substantially constant speed and cooperating with contact means for sending in each of successive cycles of rotation of the cam an electrical impulse of a duration corresponding to a variable magnitude, such as rate of flow, temperature, or pressure.

A limitation of prior apparatus of this type has been that accuracy of signal length is difficult to obtain at low rates where the curvature of the cam approaches the arc of a circle and the angle between the cam edge and the rate arm therefore approaches zero. This is especially true in the telemetric transmitters used in connection with the measurement of flow where the cam is shaped so as to produce a signal proportional to the square-root of the rate arm displacement.

In my application Serial No. 261,501, filed December 13, 1951, now Patent No. 2,672,600, issued March 16, 1954, I have disclosed apparatus for obtaining accurate signals in the low, as well as the higher, range of rates, such apparatus providing two transmitters, one of which is of conventional type and the other of which has a specially designed cam which spreads out the low rate range so that accurate signaling in that range is effected. The two transmitters are connected in parallel to a receiver, and means controlled by the receiver is provided for switching the latter from one to the other of the transmitters in response to the rate indicated at the receiver.

The apparatus illustrated in my aforementioned application has proven distinctly successful in operation. It will be noted, however, that, in that apparatus, three wires are required between the transmitters 28 and 41 and the receiver 48, and while this is not objectionable when the receiver is not at too great a distance from the transmitter it is desirable to eliminate one of the wires when the receiver is more remotely located. As pointed out in that application, when the receiver is located at such distance as to render three wires undesirable, the number of wires may be reduced by locating the receiver 48 near the transmitters and providing in that receiver an extra armature and contact, connected by two wires to a conventional receiver located at the desired remote distance. This, however, would entail the need of two receivers, one (designated 48) near the transmitters and connected thereto by the three wires, and another located remotely and connected by two wires to an extra armature and contact in the receiver 48.

The present invention retains the advantages of highly accurate transmission of both large and small values of a variable magnitude, as provided by the invention disclosed in my prior application, but at the same time enables the signals to be sent from the transmitter apparatus over only two wires to a remote receiver, and furthermore without the need of any intermediate receiver to convert from three-wire to two-wire transmission.

The invention comprises a pair of transmitters for establishing electrical impulses of time-durations corresponding to a variable magnitude, and means controlled in accordance with ranges of values of said variable magnitude for determining which of said transmitters shall be connected to a two-wire system for transmitting impulses corresponding to said values to a distant receiver.

A more specific feature of the invention resides in the combination of said transmitters with means operated by one of them for switching one or the other into connection with said two-wire system, depending upon whether the values of the variable magnitude are in a higher or a lower range.

Other features and advantages of the invention will be hereinafter described and claimed.

In the accompanying drawings there is shown a telemetric system arranged in accordance with my invention and illustrating the features thereof.

In the drawing, 10 indicates a Venturi tube or other differential pressure producer to which a high differential manometer 12 is connected by pressure pipes 14 and 16. A low differential manometer 18 is connected in parallel with manometer 12 by means of pressure pipes 20 and 22.

The manometers 12 and 18 contain mercury or other suitable liquid which, in well-known manner, is displaced from one well of the manometer to the other well in response to changes in the differential pressure created in the Venturi tube.

In the manometer 12, there is a float 23 resting on the mercury surface. Motion of the float is transmitted to the shaft 24 by means such as a rack 25 and gear segment 26.

Attached to shaft 24 is a rate arm 27 of telemetric transmitter 28. Cooperating with rate arm 27 is a cam 29 continuously rotated by synchronous electric motor 30.

It will be seen that the rate arm 27 will assume a position relative to the center of cam 29 dependent upon the displacement of the float in manometer 12. One wire 31 of a telemetric circuit is connected to arm 27 by means of a brush 33, and another wire 32 of the telemetric circuit is connected to the shaft of cam 29 by means of brush 35. Wire 31 is connected through wire 34 to one terminal of a source of electromotive force, the opposite terminal of which is connected, through wire 36, to a solenoid 37 of a distant receiver 38. Said solenoid is also connected, through a wire 39 to a switch arm 40, which is operable under control of a solenoid 41 into engagement with either one of a pair of contacts 42, 43. When said solenoid 41 is deenergized, the switch arm 40 is maintained in engagement with contact 43 by a spring 44. The aforementioned wire 32 is connected at one end to the contact 42 and at its opposite end to the brush 35 on the shaft of the transmitter cam 29.

It will be seen that the circuit through wires 34, 31 and 32 will be completed in the transmitter 28 during that part of each revolution of cam 29 in which the rate arm 27 rides on the cam 29. The cam 29 is so shaped that the duration of the telemetric signal in each cycle is proportional to the square root of the position of rate arm 27 relative to the center of cam 29, and therefore to the square root of the position of float 23, and therefore to the rate of flow through the Venturi tube 10.

The manometer 18 contains a float 45, a rack 46 and a gear segment 47 connected to shaft 76 to position rate arm 49 of telemetric transmitter 50 in the same manner as described for transmitter 28.

Manometer 18 is of well-known type in which full float travel occurs upon relatively low differential pressure from Venturi tube 10, and manometer 12 is of well-known type in which full float travel occurs upon relatively high differential pressure from Venturi tube 10. As a result of this combination the rate arm 49 of telemetric transmitter 50 moves over its full range during the lower differential range, whereas rate arm 27 of telemetric transmitter 28 moves over its full range during the high differential range.

Cam 51 of transmitter 50 is continuously rotated by synchronous motor 52 and cooperates with rate arm 49 to complete a telemetric circuit from wire 34 to a wire 53 by means of wire 54 and brush 48, rate arm 49, cam 51, and brush 55. Said wire 53 is connected at one end to the previously mentioned contact 43 and at its opposite end to said brush 55, which engages the shaft of the transmitter cam 51.

The cam 51 is so shaped that the duration of the elemetric signal in each cycle is proportional to the square root of the position of rate arm 49 relative to the center of cam 51, and therefore to the square root of the position of float 45. Thus, the duration of each of said signals is proportional to the rate of flow through Venturi tube 10 within the range of the relatively low rates of flow corresponding to the travel of said float. Said cam is so shaped that for each increment of change of float position within said range, a substantial change of signal duration is effected through the engagement of said cam and the rate arm 49.

When the flow rates in Venturi tube 10 exceed the low range, the manometric liquid in a manometer 18 merely is displaced downward out of the float chamber without causing further movement of the float. For this purpose, downward movement of the float may be limited by engagement of the float with inwardly converging walls of the manometer chamber, or with any other suitable stop positioned below said float.

Movable with the rate arm 49 about the pivot of said arm is a tilting switch 57 of well-known type in which a circuit is made or broken by the movement of a globule of mercury. Conveniently, said switch may be mounted on an arm 58 integral with or attached to said rate arm, as shown. As long as the flow rate is below a predetermined value, i. e., below the maximum value of the low-rate range measured by the manometer 18, the mercury globule in the switch 57 does not bridge the contacts of that switch. One of said contacts, as shown, is electrically connected to the brush 48, while the other contact is connected through wire 60 to one terminal of the previously mentioned solenoid 41, the opposite terminal of which is connected by wire 61 to wire 36, and thus to the source of electromotive force.

When the aforesaid contacts of the switch 57 are not bridged by the mercury globule, the solenoid 41 is deenergized, and its armature 40 is maintained by the spring 44 in engagement wih contact 43. There being no connection between contact 42 and said armature 40, no current can flow through wire 32 to wire 39, and the high-rate transmitter 28 is thus ineffective to send any impulses to the receiver 38.

Under these conditions, however, whenever the rate arm 49 is in engagement with cam 51 during the rotation of the latter, current flows from the source of electromotive force through wires 34 and 54, brush 48, rate arm 49, cam 51, brush 55, wire 53, contact 43, armature 40, wire 39, receiver solenoid 37, and wire 36 back to said source. Thus the low-rate transmitter is effective to energize to receiver solenoid 37 once in each cycle of rotation of cam 51 for a period represented by the duration of engagement of said cam with the rate arm 49.

The receiver 38 is of a conventional type, comprising a clutch unit 63 of well-known design, having a member 64 which moves in each cycle during the time that the telemetric signal is on (i. e., when the solenoid 37 is energized) and a member 65 which moves in each cycle during the time that the telemetric signal is off (i. e., when solenoid 37 is deenergized). The indicating pointer 66 is positioned alternately by the clutch members 50 and 51 by suitable linkages to indicate the rate of flow. An example of a suitable type of receiver which may be employed is illustrated in the Huxford Patent No. 2,145,026, issued January 24, 1939.

As above noted, when the contacts of the switch 57 are not bridged by the mercury globule, the low-rate transmitter 50 is effective to send an electrical impulse to the receiver in each cycle of rotation of the cam 51, whereby the solenoid 37 is energized in that cycle for the duration of that impulse, which in turn depends upon the position of the rate arm 49, corresponding to the rate of flow of the liquid in the conduit 10. As long as said solenoid 37 is energized, its armature 68 is engaged with a contact 69, establishing a connection from wire 70 (connected to one terminal of a source of electromotive force) through armature 68, contact 69, wire 71, clutch unit 64, and back to wire 72 (connected to the opposite terminal of the last mentioned source of electromotive force), whereby said clutch unit is energized. When the solenoid 37 is deenergized in each cycle of rotation of cam 51, upon movement of the latter out of contact with rate arm 49 the armature 68 of said solenoid is shifted by spring 73 into engagement with a contact 74, establishing a circuit from wire 70 through said armature and contact, wire 75, clutch unit 65, and back to wire 72. Said clutch unit 65 is now energized, and the clutch unit 64 is deenergized. The position of the pointer 66 at the end of the cycle of rotation of the transmitter cam 51 thus depends upon the relative durations of energization of said clutch units 64 and 65, which in turn depend upon the duration of the impulse received by the solenoid 37 from the transmitter in said cycle.

Now, when the flow rate of the liquid in the conduit 10 rises to the upper limit of the values in the range of operation of the manometer 18, the switch 57 is moved sufficiently to bring the mercury globule into a position wherein it bridges the switch contacts and thereby electrically connects the brush 48 and wire 60. Current now flows from wire 34 through wire 54, brush 48, switch 57, wire 60, solenoid 41, and wire 61 to wire 36. The energizing of said solenoid 41 withdraws armature 40 from engagement with contact 43, disrupting flow of current from transmitter 50, and brings said armature into engagement with contact 42. Thus a path for the flow of current from the transmitter 28 to the receiver solenoid 37 is established by way of wires 34 and 31, brush 33, rate arm 27, cam 29, brush 35, wire 32, contact 42, armature 40, wire 39, solenoid 37, and wire 36. The solenoid 37 is thus energized in each cycle of rotation of the transmitter cam 29 as long as the rate arm 27 is engaged with said cam, and is deenergized for the remainder of said cycle, whereby the position of the pointer 66 at the end of the cycle corresponds with the duration of the impulse from said transmitter. Said pointer thus now indicates values in the higher range for which the transmitter 28 is provided.

While the foregoing description has been specifically directed to the telemetering of flow rates which inherently involve a square-root relation between rate of flow and differential pressure in which the features of the dual transmitters are particularly advantageous, it will be understood that the principle of my invention may be applied to the transmission of linear or other functions to obtain greater accuracy in the low rate range.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. In a telemetering system, a plurality of transmitters, one having means for sending in each of a series of uniform time cycles an impulse of a duration corresponding to a value of a variable within a predetermined low range and the other having means for sending in each of a series of uniform time cycles an impulse of a duration corresponding to a value of said variable within a higher range, and means controlled by one of said transmitters for selectively connecting said transmitters to a telemetering channel.

2. In a telemetering system, a plurality of transmitters, one having means for sending in each of a series of uniform time cycles an impulse of a duration corresponding to a value of a variable within a predetermined low range and the other having means for sending in each of a series of uniform time cycles an impulse of a duration corresponding to a value of said variable within a higher range, and means controlled by one of said transmitters for connecting one of said transmitters to a telemetering channel when the values of said variable are in said low range and for connecting the other of said transmitters to said channel when said values are in said higher range.

3. Telemetric apparatus comprising a transmitter having an element movable in response to low range values of a variable magnitude and a rotatable cam cooperating with said element for sending in a cycle of rotation of said cam an electrical impulse of a duration corresponding to a value of said variable within said low range, a second transmitter having an element movable in response to values of said variable magnitude extending into a range substantially higher than the first-mentioned range and a rotatable cam cooperating with said element for sending in a cycle of rotation of said cam an impulse of a duration corresponding to a value of said variable outside said lower range, and means controlled by one of said transmitters for rendering the first transmitter ineffective and the second transmitter effective in response to a predetermined maximum value of said lower range.

4. Telemetric apparatus comprising a transmitter having an element movable in response to low range values of a variable magnitude and a rotatable cam cooperating with said element for sending in a cycle of rotation of said cam an electrical impulse of a duration corresponding to a value of said variable within said low range, a second transmitter having an element movable in response to values of said variable magnitude extending into a range substantially higher than the first-mentioned range and a rotatable cam cooperating with said element for sending in a cycle of rotation of said cam an impulse of a duration corresponding to a value of said variable outside said lower range, and means comprising a switch movable concurrently with the rate arm of one of said transmitters for rendering the first transmitter ineffective and the second transmitter effective in response to a predetermined maximum value of said lower range.

5. Telemetric apparatus comprising a transmitter having an element movable in response to low range values of a variable magnitude and a rotatable cam cooperating with said element for sending in a cycle of rotation of said cam an electrical impulse of a duration corresponding to a value of said variable within said low range, a second transmitter having an element movable in response to values of said variable magnitude extending into a range substantially higher than the first-mentioned range and a rotatable cam cooperating with said element for sending in a cycle of rotation of said cam an impulse of a duration corresponding to a value of said variable outside said lower range, maintaining the first transmitter effective and the second ineffective when the values of said variable magnitude are in said lower range, and for rendering said first transmitter ineffective and the second effective in response to a predetermined maximum value of said lower range.

6. In a telemetering system, a transmitter comprising means responsive to values of a variable magnitude within a predetermined low range and cyclically operable means cooperating with said responsive means for sending in each of a series of uniform time cycles an impulse of a duration corresponding to a value in said low range, a second transmitter comprising means movable freely with respect to the first mentioned transmitter in response to values of said variable magnitude within a higher range and cyclically operable means cooperating with the last-mentioned responsive means for sending in each of a series of uniform time cycles an impulse of a duration corresponding to a value of said variable magnitude within said higher range, and means controlled by one of said responsive means for rendering the first transmitter effective to send cyclical impulses when the values of said variable magnitude are in said lower range and for rendering the second transmitter effective to send cyclical impulses when said values are in said higher range.

7. In a telemetering system, a transmitter comprising means responsive to values of a variable magnitude within a predetermined low range and cyclically operable means cooperating with said responsive means for sending in each of a series of uniform time cycles an impulse of a duration corresponding to a value in said low range, a second transmitter comprising means movable freely with respect to the first mentioned transmitter in response to values of said variable magnitude within a higher range and cyclically operable means cooperating with the last-mentioned responsive means for sending in each of a series of uniform time cycles an impulse of a duration corresponding to a value of said variable magnitude within said higher range, and means comprising a switch actuated by one of said responsive means for rendering the first transmitter effective to send cyclical impulses when the values of said variable magnitude are in said lower range and for rendering the second transmitter effective to send cyclical impulses when said values are in said higher range.

8. In a telemetering system, a transmitter comprising means responsive to values of a variable magnitude within a predetermined low range and means continuously operable through predetermined extents in successive uniform time cycles and cooperating with said responsive means for sending cyclical impulses of durations corresponding to values in said low range, a second transmitter comprising means responsive to values of said variable magnitude within a higher range and means continuously operable through predetermined extents in successive uniform time cycles and cooperating with the last-mentioned responsive means for sending cyclical impulses of durations corresponding to values of said variable magnitude within said higher range, and means comprising a switch actuated by said low-range responsive means for rendering the first transmitter effective to send cyclical impulses when the values of said variable magnitude are in said lower range and for rendering the second transmitter effective to send cyclical impulses when the values of said variable magnitude are in said higher range.

9. In a telemetering system, a plurality of transmitters, one having means for sending in each of a series of uniform time cycles an impulse of a duration corresponding to a value of a variable within a predetermined low range and the other having means for sending in each of a series of uniform time cycles an impulse of a duration corresponding to a value of said variable within a predetermined higher range, a telemetering channel comprising no more than two wires for conveying impulses from said transmitters to a distant receiver, and means controlled by values of said variable for selectively connecting said transmitters to said receiver.

10. In a telemetering system, a plurality of transmitters, one having means for sending in each of a series of uniform time cycles an impulse of a duration corresponding to a value of a variable within a predetermined low range and the other having means for sending in each of a series of uniform time cycles an impulse of a duration corresponding to a value of said variable within a predetermined higher range, a telemetric receiver for responding to impulses from said transmitters, a telemetering channel comprising no more than two wires connected to said receiver for conveying thereto impulses from said transmitters, and means controlled by values of said variable for connecting one of said transmitters to said channel when said values are in said low range and for connecting the other of said transmitters to said receiver when said values are in said higher range.

References Cited in the file of this patent

UNITED STATES PATENTS

| | | |
|---|---|---|
| 2,533,091 | Campani | Dec. 5, 1950 |
| 2,536,465 | Reeves | Jan. 2, 1951 |